M. KARP.
MEANS FOR FLANGING CAN BODIES.
APPLICATION FILED DEC. 7, 1914.
1,162,930.
Patented Dec. 7, 1915.
7 SHEETS—SHEET 1.
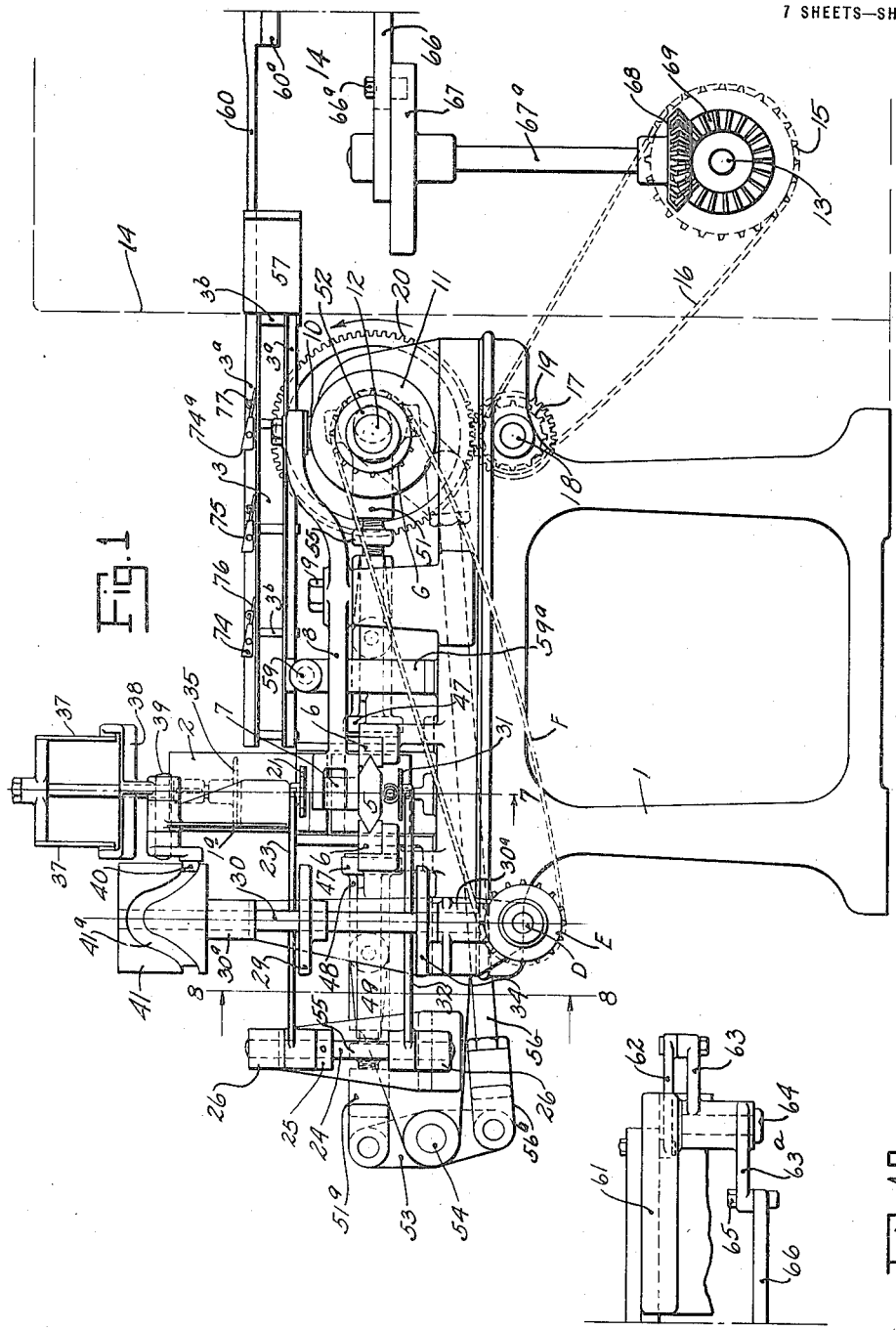

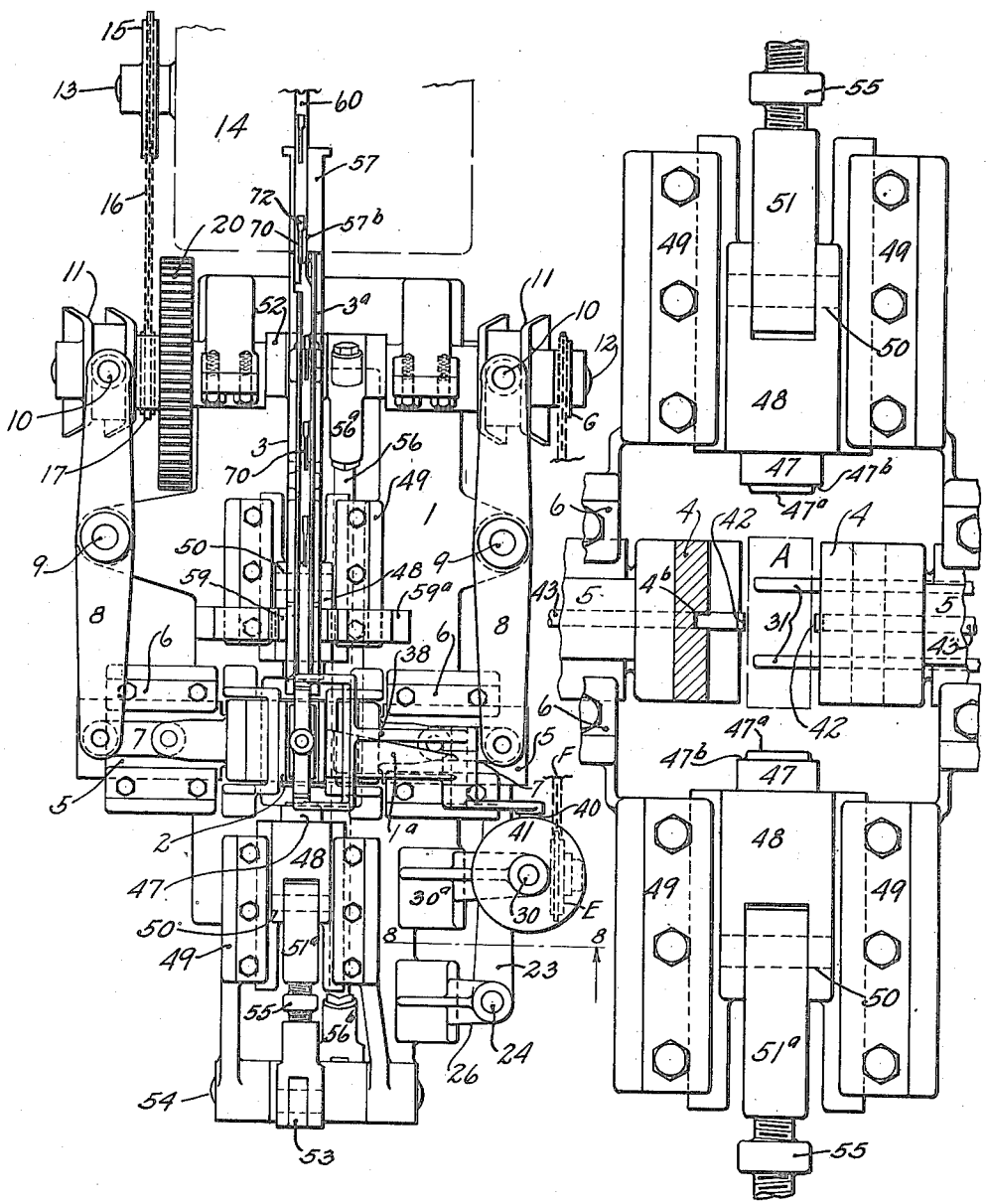

M. KARP.
MEANS FOR FLANGING CAN BODIES.
APPLICATION FILED DEC. 7, 1914.
1,162,930.  Patented Dec. 7, 1915.
7 SHEETS—SHEET 4.
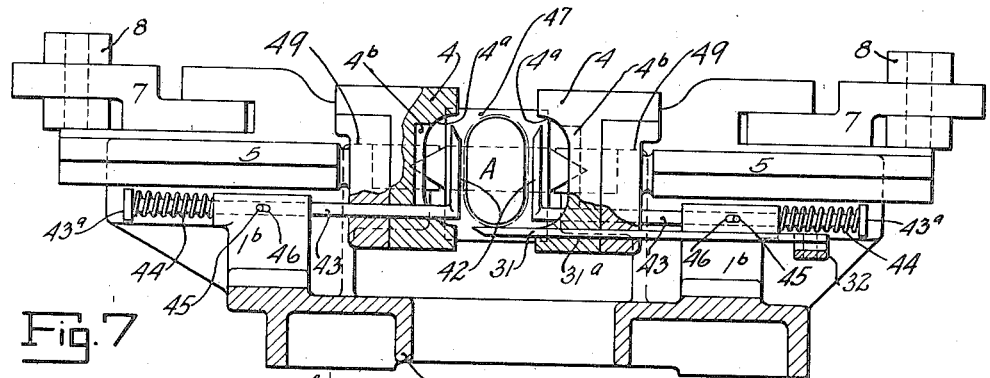
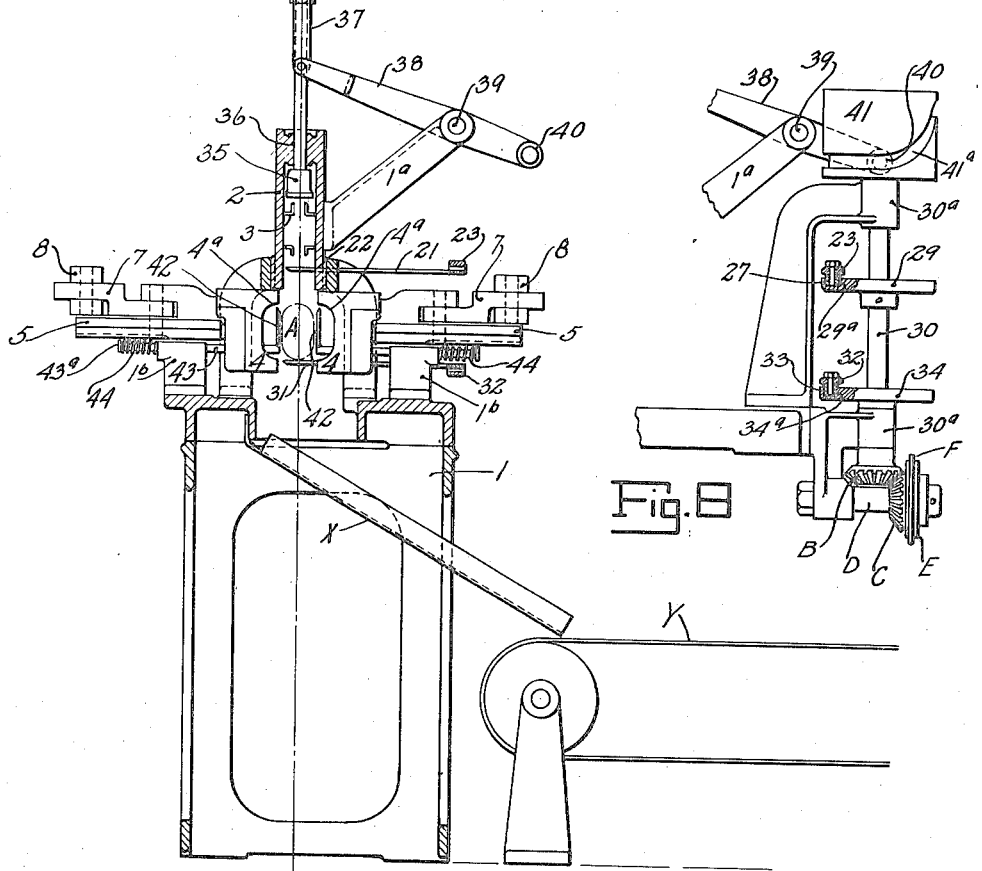

M. KARP.
MEANS FOR FLANGING CAN BODIES.
APPLICATION FILED DEC. 7, 1914.
1,162,930.
Patented Dec. 7, 1915.
7 SHEETS—SHEET 3.
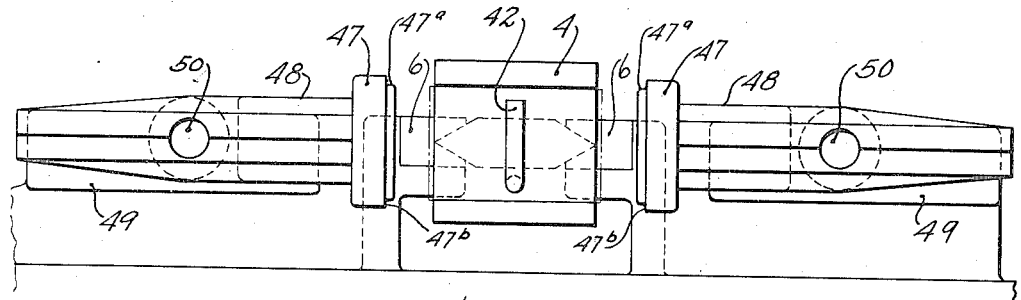
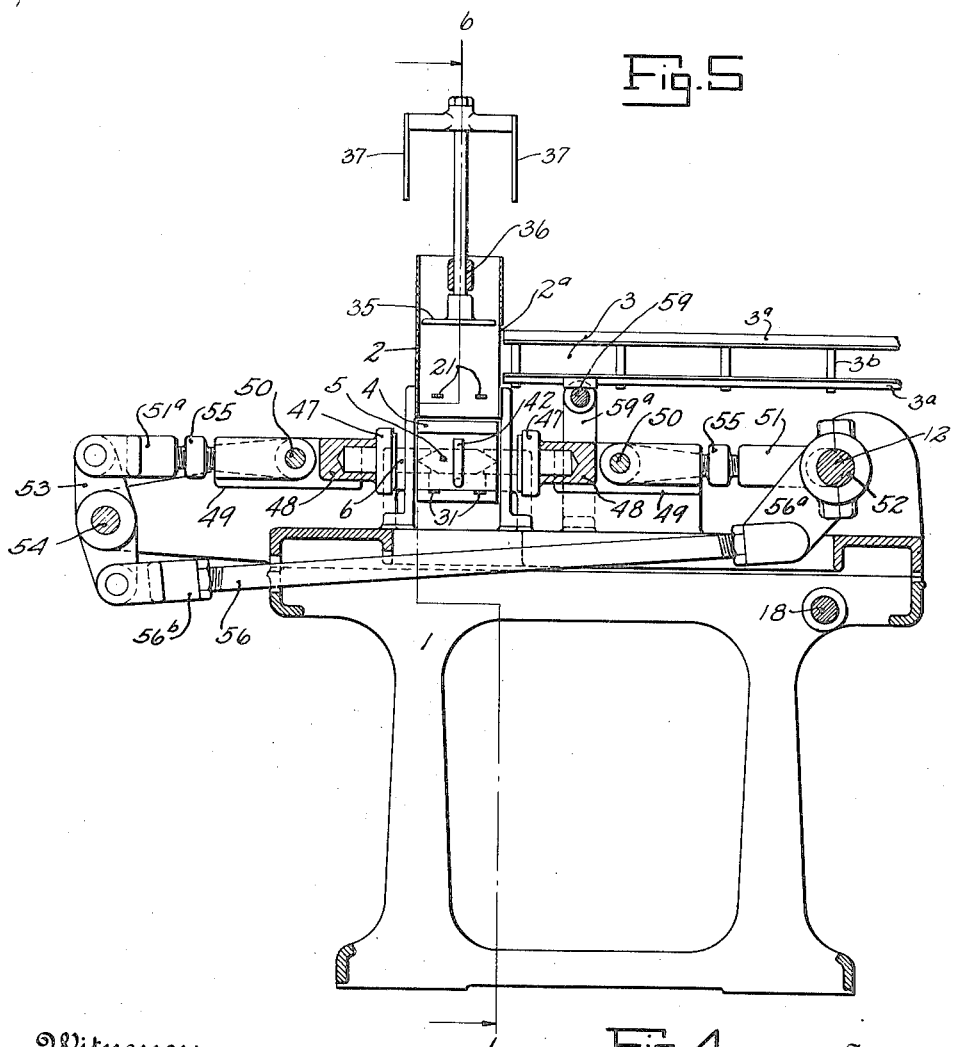

M. KARP.
MEANS FOR FLANGING CAN BODIES.
APPLICATION FILED DEC. 7, 1914.

1,162,930. Patented Dec. 7, 1915.
7 SHEETS—SHEET 5.

Witnesses:

Inventor
M. Karp
By his Attorney

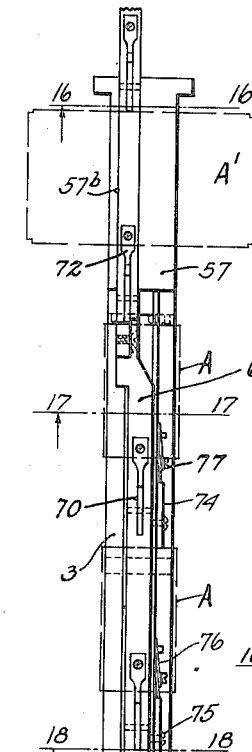

M. KARP.
MEANS FOR FLANGING CAN BODIES
APPLICATION FILED DEC. 7, 1914.
1,162,930.
Patented Dec. 7, 1915.
7 SHEETS—SHEET 7.
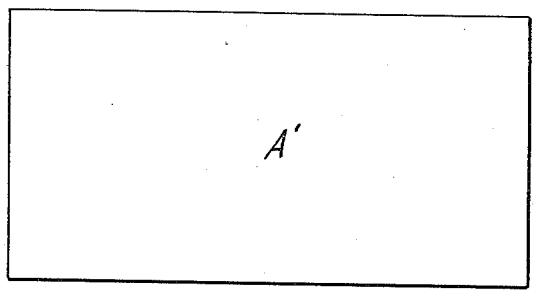
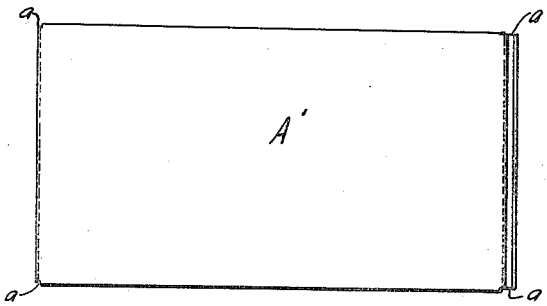
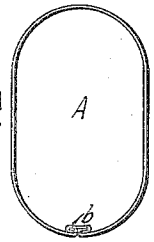 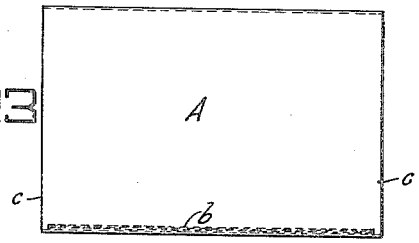
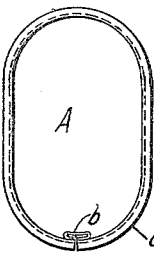 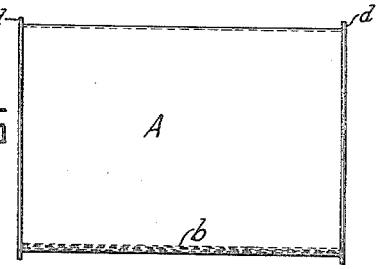
Witnesses:
Inventor
M. Karp
By his Attorney

UNITED STATES PATENT OFFICE.

MORRIS KARP, OF PASSAIC, NEW JERSEY, ASSIGNOR TO PASSAIC METAL WARE COMPANY, OF PASSAIC, NEW JERSEY, A CORPORATION OF NEW JERSEY.

MEANS FOR FLANGING CAN-BODIES.

1,162,930.  Specification of Letters Patent.  Patented Dec. 7, 1915.

Application filed December 7, 1914. Serial No. 875,861.

*To all whom it may concern:*

Be it known that I, MORRIS KARP, a citizen of the United States, and resident of Passaic, in the county of Passaic and State of New Jersey, have invented certain new and useful Improvements in Means for Flanging Can-Bodies, of which the following is a specification.

The object of this invention is to provide flanges at the ends of blanks, such as hollow bodies, to which flanges suitable heads may be applied for the production of containers or receptacles, such as tin cans and the like.

In carrying out the invention the blanks or bodies (without heads) are grasped or gripped by suitable grippers to temporarily retain said bodies to stiffen them and prevent them from being crushed or bent when being flanged, then a plunger is forced against the end of the can body to upset or bend the end portion of the body to provide a flange thereon, and then the plunger is retracted and the body released from the grippers and delivered.

In the embodiment of the invention illustrated in the accompanying drawings opposing plungers operate on the gripped bodies, whereby flanges at opposite ends of the bodies may be formed, each plunger serving as an abutment for the hollow body when pressed by the opposing plunger during the body-flanging operation. Means are also provided for feeding the hollow bodies successively to a receiver or hopper; for temporarily retaining said bodies in position between the grippers and opposed to the plungers; for releasing flanged bodies from such positions, and for removing said bodies from the machine.

The invention also comprises novel details of improvement and combinations of parts that will be more fully hereinafter set forth and then pointed out in the claims.

Figure 9:
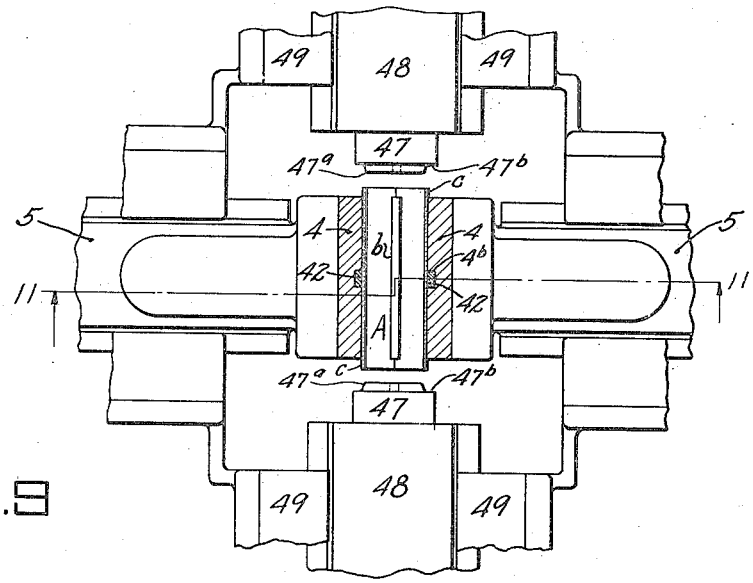
Figure 10:
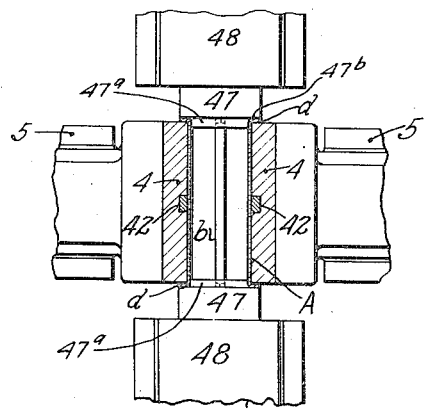
Figure 11:
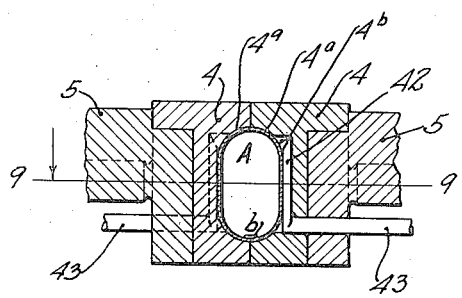

Reference is to be had to the accompanying drawings forming part hereof, wherein, Figure 1 is a side elevation of a machine adapted to carry out this invention; Fig. 1ᵃ is a detail view hereinafter referred to; Fig. 2 is a plan view of Fig. 1; Fig. 3 is an enlarged detail of a portion of Fig. 2, partly in section; Fig. 4 is a central vertical section of the machine with parts omitted, on the line 4, 4, in Fig. 6; Fig. 5 is an enlarged detail view of parts shown in Fig. 4; Fig. 6 is a vertical section on the line 6, 6, in Fig. 4; Fig. 7 is an enlarged detail cross section substantially in the plane of the line 7, in Fig. 1; Fig. 8 is a detail view taken substantially from the plane of the lines 8, 8, in Figs. 1 and 2, part being in section beyond said lines; Fig. 9 is an enlarged detail plan, partly in section, illustrating a hollow body clamped ready to be flanged, taken substantially on the line 9, 9, in Fig. 11; Fig. 10 is a view of a portion of Fig. 9, illustrating the hollow body as flanged at its ends; Fig. 11 is a section on the line 11, 11, in Fig. 9; Fig. 12 is an enlarged plan view of the means for feeding hollow bodies to the receiver or hopper; Fig. 13 is a detail section through the reciprocative bar of Fig. 12, illustrating a hollow-body feeding dog; Fig. 14 is a detail side view of the stationary bar of Fig. 12 illustrating a stop dog for the hollow bodies; Fig. 15 is a detail of part of the body forming machine with which the present improvements are connected; Fig. 16 is a section on the lines 16, 16, in Figs. 12 and 15, through the mandrel of the body forming machine; Fig. 17 is a section on the line 17, 17, in Fig. 12; Fig. 18 is a section on the line 18, 18, in Fig. 12; Fig. 19 is a section on the line 19, 19, in Fig. 12; Fig. 20 illustrates a blank for a can body; Fig. 21 illustrates the blank prepared at the ends for seaming; Figs. 22 and 23 illustrate end and side views of the can body when seamed ready for flanging, and Figs. 24 and 25 illustrate the can body when flanged according to this invention.

Similar numerals and letters of reference indicate corresponding parts in the several views.

The hollow bodies, to be flanged at their ends in accordance with this invention, may be made on any suitable body forming machine adapted for the purpose. In the accompanying drawings a portion of such a body forming machine is illustrated more or less diagrammatically, certain parts of which machine are shown as connected with means for feeding hollow bodies to the machine herein described for flanging the ends of the bodies. While hollow bodies, such as bodies for tin cans, of any suitable construction, may be flanged, at the end or ends thereof, it is found desirable that the longitudinal seams of such bodies should not be quite so long as the length of the bodies before being flanged, so as not to interfere with the flanging operation and to not require the metal at the ends of the seams to be flanged. To this end, in Fig. 20 a blank for a can body is shown at A', and in Fig. 21 the corners of the blank are shown cut out at a, and the ends bent or crimped ready for seaming, whereby when the body A is formed and seamed, as shown in Figs. 22 and 23, the seam b will terminate at a suitable distance within the end or ends of the body, providing thereon the adjacent marginal end portion or portions c, beyond the ends of the seam, that are to be turned over to provide the end flange at d, illustrated in Figs. 24 and 25. The position of the can body A in the machine, gripped ready to have flanges produced at its ends, is shown in Fig. 9, and the can body with the flanges d produced thereon is shown in Fig. 10.

Referring now to the body-flanging machine herein illustrated, the numeral 1 illustrates a suitable frame, which is provided with a receiver or hopper 2 of any suitable construction, into which the hollow bodies to be flanged are successively fed. For this purpose the hopper 2 is provided with a side opening 2ᵃ (Fig. 4) that registers with a suitable track or guideway, indicated generally at 3, for guiding the hollow can bodies and depositing them in said receiver, as will be more fully hereinafter set forth. At the lower portion of or beneath the receiver or hopper 2, means are provided for retaining and grasping the hollow body while its end or ends are being flanged, and for releasing the flanged body. For this purpose reciprocative grippers 4 are suitably supported and guided opposed to each other, to grip the can bodies between them. Said grippers are shown provided with inner faces 4ᵃ substantially corresponding to the contour of hollow body A to grasp the same (Figs. 6, 7 and 11). Said grippers are formed on or carried by suitable slides 5, which are supported to reciprocate in guides 6 secured upon frame 1 (Figs. 1 and 2). Said grippers are to be reciprocated toward and from the can body, and to this end the guides 5 are shown pivotally connected by links 7 with arms 8 pivoted at 9 on the frame 1, and having projections or rollers at 10 coacting with cams 11 that are secured upon shaft 12 journaled in suitable bearings on frame 1 (Figs. 1 and 2). Shaft 12 may be rotated by any suitable means. Where the present improvements are to be operated in conjunction with a can-body forming machine, to receive the cans therefrom as they are formed, it is preferable to drive shaft 12 from a shaft 13 of such can-body forming machine, a portion of which machine is indicated generally at 14 (Figs. 1 and 2). For such purpose the shaft 13 is shown provided with a sprocket wheel 15 receiving a chain 16, that passes over a sprocket wheel 17 on a shaft 18 that is journaled in suitable bearings in frame 1, shaft 18 being provided with a gear 19 meshing with a gear 20 secured upon shaft 12, whereby shafts 12 and 13 rotate at the same speed.

In order to feed the hollow bodies A delivered from the guide 3 to the proper position between the grippers 4, at the proper time, a retainer, shown in the form of fingers 21 (Figs. 4 and 6) is guided to reciprocate across receiver or hopper 2 on a level below guide 3. Said fingers are shown guided in suitable openings at 22 (Fig. 6) in the receiver or hopper 2, and at their outer ends said fingers are pivotally connected with an arm 23 which is journaled upon a rod or shaft 24 having a collar 25 to support said arm, (Fig. 1), which rod or shaft is supported in suitable brackets 26 on frame 1. Arm 23 is to be rocked at the proper time to cause release of the bodies A, and to this end said arm is provided with a suitable projection or roller 27 (Fig. 8) that operates in conjunction with a cam 29 shown having a surface groove 29ᵃ (Fig. 8), which cam is secured to a shaft 30 journaled in suitable bearings 30ᵃ upon frame 1. The arrangement is such that retainer 21 projects into receiver or hopper 2, to receive bodies A deposited in said receiver from guide 3, and at the proper times cam 29 causes retainer 21 to be retracted to permit said bodies to descend to a position between the grippers 4. To retain the bodies A temporarily in position between the grippers 4 a rest is provided (Figs. 1, 3, 4, 6 and 7) in position to project under said bodies and retain them in position to be grasped by the grippers 4. Said rest is shown in the form of fingers 31 that are guided in suitable openings at 31ᵃ (Fig. 7) and are pivotally connected with an arm 32 that is journaled upon rod or shaft 24 (Fig. 1). Said arm 32 is shown provided with a projection or roller 33 adapted to coact with a cam 34 secured on shaft 30 (Figs. 1 and 8). Said cam is shown provided with a surface groove 34ᵃ receiving projection 33, whereby, as said cam rotates, the rest 31 will be reciprocated. In order to assure the proper descent of the bodies A to a position between the grippers and upon the rest of fingers 31, a plunger is provided at 35 and guided to reciprocate within receiver or hopper 2, (Figs. 1, 4 and 6), being adapted to be raised above the plane of guide 3 to permit the bodies A to pass under said plunger to rest upon retainer 21, and to descend to carry said bodies down properly upon rest or fingers 31. The stem of plunger 35 is shown guided at 36 and is pivotally connected by links 37 with the forked end of a rock arm 38 journaled at 39 upon a bracket 1ᵃ of frame 1, (Figs. 1, 2, 6 and 8). The outer end of arm 38 is provided with a pin or roller 40 engaging a groove 41ª of a barrel cam 41, that is secured upon shaft 30. Shaft 30 is shown provided with a gear B meshing with a gear C journaled on a shaft or stud D carried by frame 1, the gear being secured to a sprocket E (Fig. 8) that receives a chain F from a sprocket G secured on shaft 12, whereby shaft 30 and its cams are rotated in proper time.

The relation of the parts so far described is such that when the parts are in their normal positions, (Fig. 6), the grippers 4 will be retracted, the retainer 21 and rest 31 will be advanced in the path of a body A through the receiver or hopper 2, and the plunger 35 will be elevated, so that when a body A is pushed off of guide 3 into the receiver or hopper 2, said body will first rest upon retainer 21. Thereupon retainer 21 will be retracted and plunger 35 will descend, causing the body A to descend and be properly seated upon the rest 31. The grippers 4 thereupon are moved toward the body to grasp it exteriorly, and the retainer 21 returns into the receiver or hopper, the plunger 35 likewise returning to its normal position, the can body then being held firmly by the grippers in position to have one or more of its ends flanged. After the body A has been flanged (as hereinafter explained), the grippers 4 recede and release the body, and then the rest 31 recedes from under the body, said rest again returning beneath the receiver or hopper before another body A is deposited between the grippers 4.

As a means to assure stripping of the flanged bodies A from the grippers 4, opposing spring-acting strippers 42 are provided, between which the bodies A rest when being gripped. Said strippers are shown extending upwardly from sliding rods 43 in position between the grippers 4, and to conceal said strippers when the bodies A are gripped, the grippers 4 are provided with recesses 4ᵇ in their inner faces to receive said strippers (Figs. 3, 7 and 11), whereby said strippers will not affect the can bodies, but will dislodge said bodies from the grippers 4 when the latter recede from body A. The rods 43 are guided in suitable openings in the grippers and in brackets 1ᵇ of frame 1 (Fig. 7), and said rods and strippers are normally pressed outwardly or away from the can bodies by springs 44, shown coiled around said rods and bearing at one end against the corresponding bracket 1ᵇ, and at the opposite end against the head 43ª on rod 43. The outward movement of rods 43 and strippers 42 is limited by the pins 45 projecting from said rods and operating in slots 46 in brackets 1ᵇ (Fig. 7), whereby the strippers are normally held retracted sufficiently to enable the bodies A to pass between said strippers, and whereby said bodies are temporarily retained by said strippers in an approximately correct position upon the rest 31 between the grippers 4. When said grippers are pressed toward the body A the strippers 42 will enter the recesses 4ᵇ of the grippers and will be pressed forwardly by and with said grippers, and when the grippers recede from body A the strippers will strip such body from the grippers, and will in turn recede from the bodies to release them. After the bodies A have been flanged at their ends, and the grippers and strippers have released said bodies, the rest 31 is withdrawn from beneath said bodies, whereupon the latter may be delivered to any suitable receptacle, as by dropping upon a chute X which may lead the bodies to an endless conveyer Y (Fig. 6).

The means illustrated for flanging the end or ends of hollow bodies, while they are securely clamped or gripped between the grippers 4, are as follows: At 47 are plungers or abutments, shown spaced apart and opposed to each other to receive the hollow bodies A therebetween, said plungers being in register with the spaces between the grippers 4, whereby when a body A is grasped by and between said grippers, said plungers may be moved against the projecting ends c of such body to produce the flanges d thereon. The plungers 47 are shown carried by slides 48, that are mounted to reciprocate in suitable ways or guides 49 secured on frame 1. The slides 48 are shown pivotally connected at 50 with links 51, 51ª, one of which links 51 is connected with a crank 52 on shaft 12, and the link 51ª is shown pivotally connected with a rock arm 53 that is supported upon a shaft 54 carried by frame 1 (Figs. 1, 2 and 4). For the purpose of providing convenient adjustment of the plungers 47 with respect to the hollow bodies A, the links 51, 51ª are made longitudinally adjustable, for which purpose said links are shown provided with screws 55, interposed between the end members of the links and having right hand and left hand threads, respectively working in threads on said end members, whereby said plungers may be separately adjusted relatively to the corresponding crank 52 and arm 53. The crank 52 and arm 53 are pivotally connected with a link or rod 56, for which purpose a suitable head 56ª is shown mounted upon said crank and connected with one end of rod 56 (see Fig. 4), the opposite end of such rod being shown connected with a head 56ᵇ pivotally connected with arm 53. By means of right and left threads on rod 56, meshing with corresponding threads in the end members 56ª, 56ᵇ, adjustment between the parts 52 and 53 may be made as required.

With the arrangement described, the plungers 47 will be reciprocated conjointly toward and from the bodies A that are gripped between the grippers 4, 4, at the proper times, for flanging the end or ends of said bodies. As a convenient means for bending the edge portions of said bodies for the production of flanges thereon, the plungers 47 are shown provided with projections 47ª and abutment portions 47ᵇ. The edges of the projections 47ª are shown suitably beveled or tapered to aid in pressing the metal at the ends of the bodies A outwardly, the abutments 47ᵇ serving to press the flanged portion d of the bodies against the side faces of the grippers 4 to complete the flanging operation (see Fig. 10). It will be observed that, with the seam b shorter than the length of the hollow body A before it is flanged, the projections 47ª of plungers 47 may enter the bodies A without interfering with such seam, whereby the metal beyond seam b may be readily bent laterally without interference (see Fig. 24). After the plungers 47 have flanged the end of a hollow body, said plungers recede and thereupon the grippers 4 also recede to release such body.

The track or guideway 3, as illustrated in the accompanying drawings, is adapted to permit the hollow bodies to encircle the same and to slide thereon to receiver or hopper 2. For this purpose said track or guideway is shown comprising spaced parallel angle-bars 3ª, which are secured by screws 3ᶜ to suitably shaped blocks 3ᵇ located at suitable distances along the angle bars 3ª, (Figs. 1, 4, 18 and 19). The hollow bodies A may be applied upon track 3 in any suitable manner. In the example illustrated, the body-receiving ends of angle bars 3ª are secured to the adjacent end of a mandrel 57, as by securing one of the blocks 3ᵇ to such mandrel (Fig. 1) by screws or bolts 58 (Fig. 17). The mandrel 57 is illustrated as the mandrel of the body-forming machine 14 around which mandrel the blanks A' are formed and seamed in any well-known manner. The mandrel 57 is shown provided with a longitudinal groove 57ª to receive the seam b of the hollow body A (Fig. 16). The end of track 3 opposite to mandrel 57 is shown supported by a suitably grooved roller 59 journaled in suitable supports 59ª on frame 1, (Figs. 1, 2, 4 and 19). Said track rests freely upon roller 59 so that when the hollow bodies are slid along (and surrounding) said track, the under portions of said bodies may slide on roller 59, and raise the track 3 slightly as necessary, as said bodies are fed between said track and roller. To provide an efficient bearing surface between the lower angle bars 3ª and roller 59 filling pieces, at 3ᵈ, are shown in the form of angle members secured within the angles of bars 3ª by the screws 3ᶠ (Fig. 19), the edges of said parts 3ª and 3ᵈ being suitably curved or beveled to substantially conform to the curvature of the peripheral groove of roller 59.

Means are provided to feed the hollow bodies A, from the forming mandrel 57 into the receiver or hopper 2 along the track 3, step by step. To this end a reciprocative member 60 is extended longitudinally with respect to track 3 and mandrel 57, a portion of which member is guided in a groove 57ᵇ in mandrel 57 (Fig. 16) and a portion of which member is guided in the space between the upper angle bar 3ª, said member resting upon the upper edges of the blocks 3ᵇ (Figs. 17 and 18). A portion 60ª of member 60 is supported to reciprocate in a suitable guide 61 of machine 14 (Figs. 1ª and 15), which portion 60ª is shown pivotally connected by a link 62 with an arm 63 that is suitably supported at 64, a portion 63ª of which arm is pivotally connected at 65 with a forked rod 66 guided by shaft 67ª having a grooved cam 67, (Fig. 1), receiving a projection 66ª of rod 66. Shaft 67ª has a gear 68 in mesh with a gear 69 secured on shaft 13 of machine 14. Member 60 is thus timed to reciprocate in accordance with the rotation of shafts 18 and 12, since, in the example illustrated, they are all driven from shaft 13 by the gearing described. The member 60 is provided with any suitable number of dogs or fingers 70, which are pivotally supported at 71 in recesses 60ᵇ in member 60. Said dogs are properly spaced apart so that the upper corners 70ª of said dogs may engage the rear edges of the bodies A that are upon track 3 (Fig. 13).

At 72 are springs shown secured in recesses 60ᵇ by screws 73, which springs act upon dogs 70 to normally retain them with their edges 70ª projected above member 60 to engage bodies A on the forward or body-feeding strokes of member 60, and to permit said dogs to tilt to slide under said bodies when member 60 is retracted. Back stop dogs 74 are shown spaced apart and pivotally supported at 75 upon the outer side of an angle bar 3ª, in position to engage the rear edges of hollow bodies A on track 3, to retain the latter from being dragged back along track 3, after being fed forwardly thereon by the feeding dogs 70. Suitable springs 76 (Figs. 1 and 14) are attached to said angle bar 3ª, as at 77, one end of each such springs bearing against a stop 78 and the opposite end against the corresponding dog 74, whereby said dogs are normally maintained with the upper corners 74ª in the path of the hollow bodies A on track 3. The dogs 74 may tilt as the hollow bodies slide over them on track 3, but after such bodies pass beyond the corners 74ª of said dogs, the latter will return to normal to resist rearward movement of said bodies. It will be understood that the length of track 3 will be in accordance with the distance of receiver 2 from mandrel 57, and that the number of dogs 70 and 74 will be in accordance with the length of track 3 and the length of the bodies A to be fed thereon.

The complete operation of flanging the ends of the hollow bodies may be described as follows: The bodies A having been applied upon track or guideways 3 are fed successively, step by step, into receiver or hopper 2, the final stroke of member 60 upon the body A adjacent to the delivery end of track 3 causing such body to drop into receiver or hopper 2, where it rests upon the then projected retainer 21. At such time plunger 35 is elevated, rest 31 is projected under the body A, and the grippers 4, strippers 42 and plungers 47 are retracted. Member 60 now moves back to cause its dogs 70 to pass behind bodies A upon track 3 (the dogs 74 retaining bodies A in their fed positions), and by reason of rotation of shaft 12 the retainer is retracted to release body A; thereupon plunger 35 descends to carry such body properly down on rest 31, between the strippers 42, grippers 4 and plungers 47; plunger 35 then recedes to normal, the grippers 4 move toward body A, and firmly grasp said body, meanwhile causing the strippers 42 also to engage said body. While body A is thus exteriorly firmly grasped by the grippers 4, the plungers 47 advance toward the ends of said body and press the metal at the ends of said body outwardly, forming the flanges d thereon. Thereupon said plungers 47 recede from the flanged body, the grippers 4 recede from said body, and the strippers 42 strip the body from said grippers and release said body, and thereupon the rest 31 is retracted and releases the flanged body, which passes away below. At an appropriate time after plunger 35 is returned to normal, the retainer 21 is again projected into receiver or hopper 2, to receive the next hollow body from track 3, and so on, the bodies being fed to the receiver or hopper to be flanged and delivered therefrom successively, and step by step.

If it is desired to flange but one end of body A the projection 47$^a$ of one of the plungers 47 may be omitted, and said plunger can then be so set relatively to body A as to act merely as an abutment for said body while the opposing plunger serves to flange the end of said body opposing the last named plunger, the first named abutment serving to resist the tendency of the body to be pushed longitudinally between the grippers 4 by the flanging plunger.

After the hollow bodies have been flanged, as stated, heads or closures at the end or ends of said bodies may be applied in conjunction with such flanges, by any well known or suitable means, as for the production of containers or receptacles, such as tin cans and the like.

While the hollow bodies A are illustrated in the accompanying drawing as of substantially oval form, it will be understood that such bodies may have other suitable form, and that the parts coacting with such bodies, such as the mandrel 57, track 3, grippers 4 and plungers 47 will be made to properly correspond to the shape or contour of such bodies. While the plungers 47 have been described as operating simultaneously upon opposite ends of the bodies A, it will be understood that said plungers may be caused to operate successively at the ends of the body, to produce flanges thereon, and that such flanges on such body need not be of the same dimensions, since one of the flanges may project from the body a greater distance than the other flange.

This invention is not limited to the details of construction and arrangement of parts shown and described, as changes therein may be made without departing from the spirit of the invention.

Having now described my invention what I claim is:—

1. In a flanging machine, the combination of opposing grippers, means to cause said grippers to grip and release bodies, means to flange an end of such bodies when so gripped, strippers opposed to said grippers to strip bodies from said grippers, and means to guide the strippers to be pushed by the grippers toward bodies therebetween.

2. In a flanging machine, the combination of opposing grippers, means to cause said grippers to grip and release bodies, means to flange an end of such bodies when so gripped, strippers opposed to said grippers, rods carrying said strippers, and springs normally retracting said strippers, said strippers being in position to be pushed by said grippers as the latter advance toward a body therebetween.

3. In a flanging machine, the combination of opposing grippers, means to cause said grippers to grip and release bodies, means to flange an end of such bodies when so gripped, strippers opposed to said grippers, rods carrying said strippers, springs normally retracting said strippers, said strippers being in position to be pushed by said grippers as the latter advance toward a body therebetween, said grippers having recesses to receive said strippers.

4. In a flanging machine, the combination of opposing grippers, means to cause said grippers to grip and release said bodies, means to flange an end of such bodies when so gripped, strippers opposed to said grippers, rods carrying said strippers, springs normally retracting said strippers, said strippers being in position to be pushed by said grippers as the latter advance toward a body therebetween, and means to normally retain said strippers in position to balance bodies therebetween, said strippers being at a distance from the grippers when the latter are retracted.

5. In a flanging machine, the combination of opposing grippers, means to cause said grippers to grip and release bodies, a reciprocative plunger to flange an end of such bodies when so gripped, a stripper opposed to one of said grippers to strip bodies therefrom, a reciprocative rest movable across the path of bodies between the grippers to retain bodies between said grippers, and means to reciprocate said rest to support and release bodies from between the grippers.

6. In a flanging machine, the combination of opposing grippers, means to cause said grippers to grip and release bodies, a reciprocative plunger to flange an end of such bodies when so gripped, a stripper opposed to each gripper to strip bodies from said grippers, a reciprocative rest movable within one of said grippers to retain bodies between said grippers and strippers, and means to reciprocate said rest to support and release bodies from between the grippers and strippers.

7. In a flanging machine, the combination of opposing grippers, means to cause said grippers to grip and release bodies, means to flange an end of such bodies when so gripped, a rest normally projected to retain bodies between said grippers, opposed to the flanging means, means to retract said rest to release bodies from between said grippers, while the flanging means is retracted from such body, said rest comprising one or more fingers, means for guiding said fingers, and means to project said fingers when the grippers are retracted to admit bodies therebetween, said means serving to retract said finger or fingers to deliver bodies after the grippers have released the bodies.

8. In a flanging machine, the combination of opposing grippers, means to guide said grippers for reciprocation, pivotally supported arms movably connected with said grippers, cams to operate said arms, means to operate said cams simultaneously, opposing plungers in register with the space between said grippers, a crank, means to support and operate said crank, a link operatively connecting said crank with one of said plungers, an arm, means for operatively supporting said arm, a link operatively connecting said arm with the other of said plungers, and a link connecting said arm with said crank, whereby said plungers will be moved simultaneously toward and from each other.

9. In a flanging machine, the combination of opposing grippers, means to guide said grippers for reciprocation, pivotally supported arms movably connected with said grippers, cams to operate said arms, means to operate said cams simultaneously, opposing plungers in register with the space between said grippers, a crank, means to support and operate said crank, a link operatively connecting said crank with one of said plungers, an arm, means for operatively supporting said arm, a link operatively connecting said arm with the other of said plungers, and a link connecting said arm with said crank, whereby said plungers will be moved simultaneously toward and from each other, said links being provided with means to adjust their length to regulate the relative positions of said plungers with respect to said grippers.

10. In a flanging machine, a receiver for bodies, means to grip bodies, means to retain bodies in said receiver above the gripping means, means to release said bodies for passage in the receiver to the gripping means, a plunger to push bodies between the gripping means after said retaining means release the bodies, and means to flange such bodies when so gripped.

11. In a flanging machine, a receiver for bodies, means to grip bodies, means to retain bodies in said receiver above the gripping means, means to release said bodies for passage in the receiver to the gripping means, a plunger to push bodies between the gripping means after said retaining means release the bodies, means to flange such bodies when so gripped, a rest for said bodies to retain them temporarily between the gripping means, and means to retract said rest after the bodies have been flanged to deliver them from the gripping means.

12. In a flanging machine, a receiver for bodies, means to grip bodies, means to retain bodies in said receiver above the gripping means, means to release said bodies for passage in the receiver to the gripping means, a plunger above said retaining means, means to retract said retaining means from the bodies, means to cause the plunger to act upon the bodies when released from said retaining means, and means to flange said bodies when gripped by the gripping means.

13. In a flanging machine, a receiver for bodies, means to grip bodies, means to retain bodies in said receiver above the gripping means, means to release said bodies for passage in the receiver to the gripping means, a plunger above said retaining means, means to retract said retaining means from the bodies, means to cause the plunger to act upon the bodies when released from said retaining means, means to flange said bodies when gripped by the gripping means, a rest for said bodies to retain them between the gripping means, and means to retract said rest to deliver bodies after they have been flanged.

14. In a flanging machine, a receiver for bodies, means to grip bodies, means to retain bodies in said receiver above the gripping means, means to release said bodies for passage in the receiver to the gripping means, a plunger above said retaining means, means to retract said retaining means from the bodies, means to cause the plunger to act upon the bodies when released from said retaining means, means to flange said bodies when gripped by the gripping means, a rest for said bodies to retain them between the gripping means, means to retract said rest to deliver bodies after they have been flanged, said retaining means and said rest being simultaneously retained in the path of the bodies in the receiver to said gripping means, and means for retracting said retaining means to release said bodies while the rest is projected beneath the bodies.

15. In a flanging machine, a receiver for bodies, means to grip bodies, strippers between said means to strip bodies therefrom, a retainer to extend across the receiver to retain bodies above the gripping means, an arm to reciprocate said retainer, a cam to operate said arm, and means to flange an end of said bodies when gripped by said grippers.

16. In a flanging machine, a receiver for bodies, means to grip bodies, a retainer to extend across the receiver to retain bodies above the gripping means, an arm to reciprocate said retainer, a cam to operate said arm, means to flange an end of said bodies when gripped by said grippers, strippers between the grippers to strip flanged bodies therefrom, a movable rest for the bodies beneath the grippers, and means to retract said rest after said grippers have released a body.

17. In a flanging machine, a receiver for bodies, means to grip bodies, a retainer to extend across the receiver to retain bodies above the gripping means, an arm to reciprocate said retainer, a cam to operate said arm, means to flange an end of said bodies when gripped by said grippers, strippers between the grippers to strip flanged bodies therefrom, a movable rest for the bodies beneath the grippers, an arm to operate said rest, a cam to operate said arm, said first named cam operating to retract said retainer to permit a body to pass therefrom to said rest before the latter is retracted to release the body.

18. In a flanging machine, a receiver for bodies, means to grip bodies, a retainer to extend across the receiver to retain bodies above the gripping means, an arm to reciprocate said retainer, a cam to operate said arm, means to flange an end of said bodies when gripped by said grippers, a movable rest for the bodies beneath the grippers, means to retract said rest after said grippers have released a body, a plunger above said retainer, and means to operate said plunger to apply a body upon the rest after the retainer has been retracted.

19. In a flanging machine, a receiver for bodies, means to grip bodies, a retainer to extend across the receiver to retain bodies above the gripping means, an arm to reciprocate said retainer, a cam to operate said arm, means to flange an end of said bodies when gripped by said grippers, a movable rest for the bodies beneath the grippers, an arm to operate said rest, a cam to operate said arm, a plunger above said retainer, a cam, means operatively connecting said last named cam with said plunger, said cams operating to withdraw the retainer from under a body, cause the plunger to descend upon the body and retract the plunger from the body, and withdraw the rest from beneath the body after the latter has been flanged and released from the grippers.

20. In a flanging machine, the combination of means to grip and release bodies, means to flange an end of such bodies when so gripped, a receiver for bodies above said grippers, a track adapted to receive encircling bodies to guide bodies to said receiver, means operative relatively to said track to feed bodies along the track to said receiver, and means to push bodies through the receiver into position between the flanging means.

21. In a flanging machine, the combination of means to grip and release bodies, means to flange an end of such bodies when so gripped, a receiver for bodies above said grippers, a track adapted to receive encircling bodies to guide bodies to said receiver, means reciprocative relatively to said track to feed bodies along the track to said receiver, means to retain said bodies in set positions as fed along said track, and means to push bodies through the receiver into position between the flanging means.

22. In a flanging machine, the combination of means to grip and release bodies, means to flange an end of such bodies when so gripped, a receiver for bodies above said grippers, a track adapted to receive encircling bodies to guide bodies to said receiver, a member reciprocative relatively to said track and having means to feed bodies along said track step by step and means to push bodies through the receiver to the flanging means as fed from the track to the receiver.

23. In a flanging machine, the combination of means to grip and release bodies, means to flange an end of such bodies when so gripped, a receiver for bodies above said grippers, a track adapted to receive encircling bodies to guide bodies to said receiver, a member reciprocative relatively to said track and having means to feed bodies along said track step by step, and deposit said bodies from the end of the track into said receiver, means to retain said bodies in set positions as fed along said track and means to push bodies through the receiver to the flanging means as fed from the track to the receiver.

24. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, means operative relatively to said track to feed bodies along the track to said receiver, and means to apply bodies successively upon said track.

25. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, means operative relatively to said track to feed bodies along the track to the said receiver, a mandrel opposed to said track, and means to feed bodies to said track from said mandrel successively.

26. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, and a member reciprocative relatively to said track, said member having means to feed bodies along said track step by step.

27. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, a member reciprocative relatively to said track, said member having dogs spaced apart to feed bodies along said track step by step.

28. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, a member reciprocative relatively to said track, said member having means to feed bodies along said track step by step, and means to retain said bodies in set positions as fed along said track.

29. In a flanging machine, the combination of means to grip and release bodies, means to flange an end of such bodies when so gripped, a receiver for bodies above said grippers, means to temporarily retain bodies in said receiver, means to push bodies through the receiver to the flanging means, a track adapted to guide bodies to said receiver, a member reciprocative relatively to said track, said member having dogs spaced apart to feed bodies along said track step by step, and means to retain said bodies in set positions as fed along said track.

30. The combination of a body forming machine having a mandrel, a plunger spaced from said mandrel, means to temporarily retain bodies opposed to said plunger, a receiver to direct bodies into position opposed to said plunger, means to temporarily retain bodies in said receiver, means to push bodies through the receiver to the flanging means, a track between said mandrel and receiver, and means to feed bodies to and along said track from said mandrel to said receiver.

31. The combination of a body forming machine having a mandrel, a plunger spaced from said mandrel, means to temporarily retain bodies opposed to said plunger, a receiver to direct bodies into position opposed to said plunger, means to temporarily retain bodies in said receiver, means to push bodies through the receiver to the flanging means, a track between said mandrel and receiver, and a reciprocative member operative relatively to said mandrel and track and provided with means to feed bodies from said mandrel to and along said track to said receiver.

32. The combination of a body forming machine having a mandrel, a plunger spaced from said mandrel, means to temporarily grip bodies opposite said plunger, a receiver to direct bodies into position opposite said plunger, means to temporarily retain bodies in said receiver, means to push bodies through the receiver to the flanging means, a track between said mandrel and receiver, means to feed bodies to and along said track from said mandrel to said receiver, and means to temporarily retain bodies in such receiver above said plunger and to release said bodies to pass opposite said plunger.

33. The combination of a body forming machine having a mandrel, a plunger spaced from said mandrel, means to temporarily grip bodies opposite said plunger, a receiver to direct bodies into position opposite said plunger, means to temporarily retain bodies in said receiver, means to push bodies through the receiver to the flanging means, a track between such mandrel and receiver, and a reciprocative member operative relatively to said mandrel and track and provided with means to feed bodies from said mandrel to and along said track to said receiver.

Signed at Passaic, in the county of Passaic, and State of New Jersey, this fourth day of December, A. D. 1914.

MORRIS KARP.

Witnesses:
 WM. F. GASTON,
 FRED W. GASTON.